E. V. HARTFORD.
SPRING RETARDING DEVICE.
APPLICATION FILED MAY 2, 1913. RENEWED SEPT. 22, 1919.
1,401,252.
Patented Dec. 27, 1921.
2 SHEETS—SHEET 1.
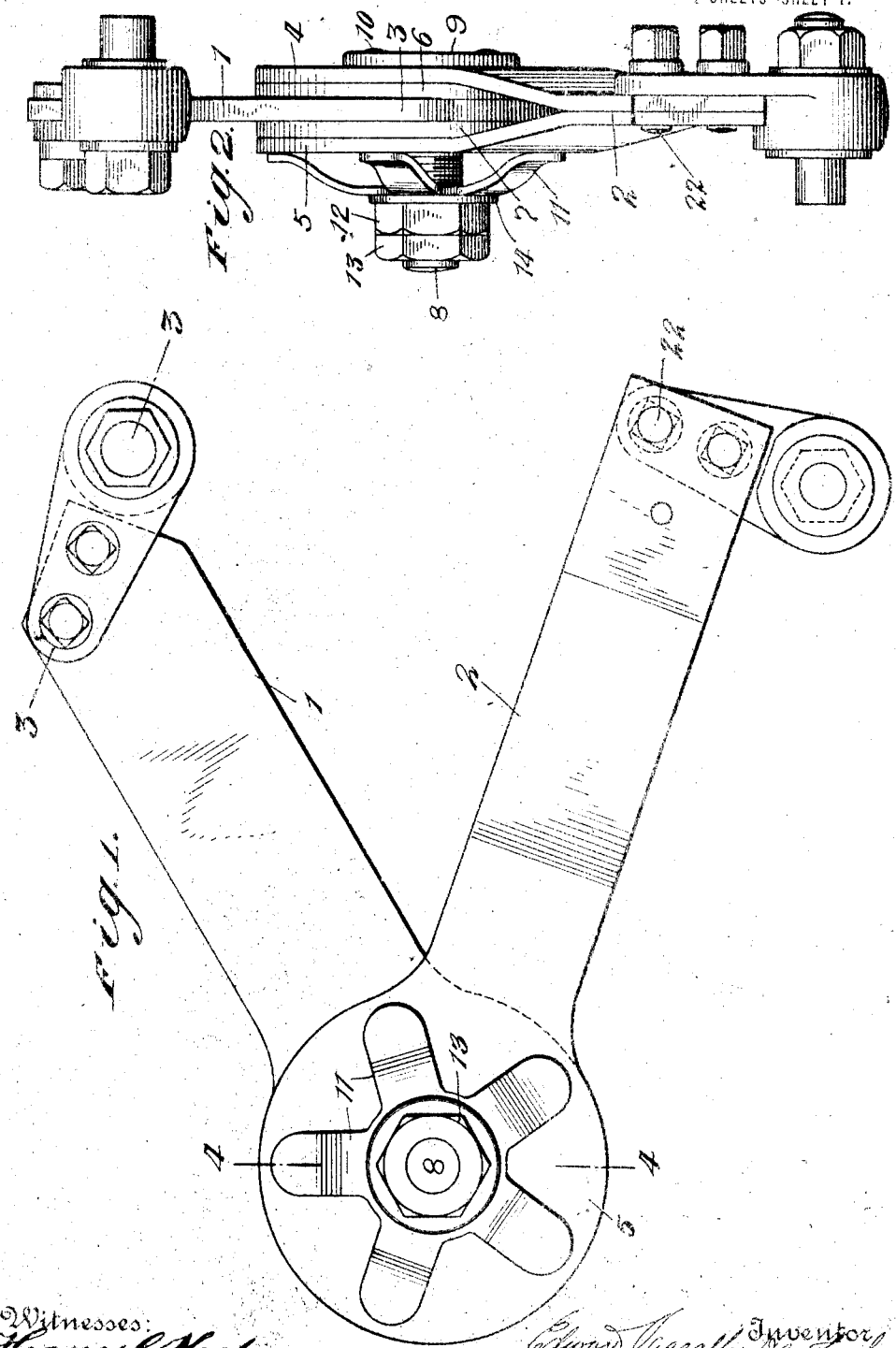

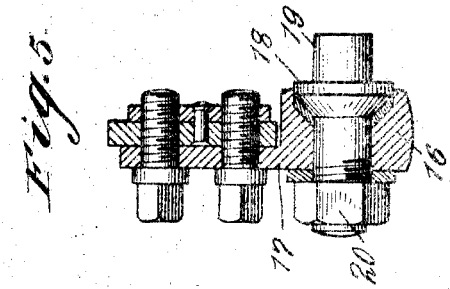
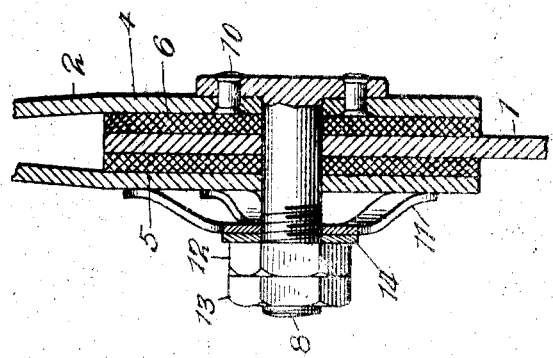
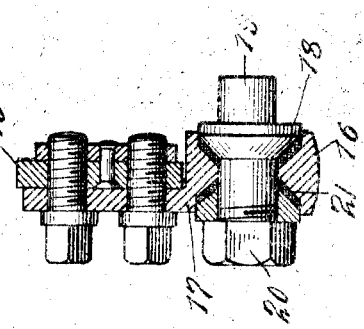

UNITED STATES PATENT OFFICE.

EDWARD VASSALLO HARTFORD, OF DEAL, NEW JERSEY, ASSIGNOR TO EDWARD V. HARTFORD, INC., OF NEW YORK, N. Y., A CORPORATION OF NEW YORK.

SPRING RETARDING DEVICE.

1,401,252. Specification of Letters Patent. Patented Dec. 27, 1921.

Continuation of application Serial No. 263,307, filed June 1, 1905. This application filed May 2, 1913. Serial No. 765,071. Renewed September 22, 1919. Serial No. 325,529.

*To all whom it may concern:*

Be it known that I, EDWARD VASSALLO HARTFORD, a citizen of the United States, residing at Deal, in the county of Monmouth and State of New Jersey, have invented certain new and useful Improvements in Spring Retarding Devices, adapted especially for use as an antivibration device for vehicles employing spring suspension means to modify the action of said spring suspension means when subjected to violent shocks and rebounds due to obstructions and irregularities in the road being traveled.

Devices of this general nature have been devised and it is the object of my present invention to improve thereon by producing a device which is of simplified construction, of increased efficiency, and cheaper to manufacture by making the parts of such shape as to conform to the simplest and cheapest methods of manufacture.

One instance of a device of this general kind is that shown in United States Letters Patent to J. M. M. Truffault, No. 743,995, in which device the supporting arms and separate friction disks of irregular shapes are pivotally connected by means of a rigid clamping means presenting an inflexible connection incapable of bending laterally or allow of a give of the parts, which is desirable and necessary to prevent a derangement thereof when the body of the vehicle is laterally swayed. To overcome this, I provide supporting arms of truss-like construction, the ends of which arms terminate in friction disks, one arm and disk being straddled by an opposing arm of fork or bifurcated construction, the frictionally engaged parts of said arms being pivoted together and held in close association by means of a yielding clamping means, the usual friction material being interposed between the active contacting ends of the arms.

This structure presents a stronger, a more compact, flexible, and efficient device, than any of those which have heretofore been designed of which I have knowledge. Stronger in its ability to withstand derangement due to side or lateral bending under sway of vehicle, and its ability to keep the parts normally in true alinement. Compact in the sense that the uniformity of parts present a complete structure within narrow limits so that the device may be accommodated in the limited space afforded by the present structure of many vehicles. The increased flexibility is secured by providing a spring of limited dimensions, which possesses the highest possible degree of spring tension, having a wide range of compressibility and so disposed with relation to the closely associated friction members as to permit them to cant or move from their normal position under laterally applied force, and to accelerate their return to normal position, and furthermore effect compensation for or take-up of wear in the parts, and at the same time to automatically maintain uniformity of pressure upon the parts, said pressure being applied at equi-distant points in the zone where the greatest frictional contacting surface exists. Finally, the greatly increased efficiency is obtained by reason of the bifurcated construction of one of the supporting members, by reason of which double the amount of friction surface is obtained at their pivoted ends without an appreciable increase in the size of the device as a whole.

In the accompanying drawings, I have illustrated one preferable embodiment of my invention and I will now proceed to describe the same, it being understood that I do not wish to be limited to the exact details of construction so illustrated and hereinafter described, reserving to myself a fair range of equivalents commensurate with the scope of the appended claims and the art as it now exists.

Figure 1 represents a side elevation of my device complete and ready for installation or application to a vehicle.

Fig. 2 is the end elevation thereof.

Fig. 3 is a detailed view of the frictional retarding connecting means for securing the operating arms to the vehicle.

Fig. 4 is a cross-sectional view of the friction disks taken on line 4—4 of Fig. 1.

Fig. 5 is a modified form of the retarding connecting means shown in Fig. 3.

Referring to the drawings in detail, the supporting arms of the device are indicated by the numerals 1 and 2, these arms are preferably formed with friction disk-like ends, the arm 1 being centrally disposed with respect to the arm 2, the latter of which is of forked or bifurcated construction. The friction ends of these arms are indicated by the numerals 3, 4, and 5. The bifurcated construction of the arm 2 acts as a truss maintaining all of the frictionally engaged parts in true alinement as well as adding rigidity and strength of support to the entire device, effecting equalization of strain or stress imparted to the different parts under lateral sway or movement of the vehicle body. Furthermore this construction enables the device to be made symmetrical in form and also substantially doubles its effective friction surface without adding any parts except one-half of the divided arm, while by keeping the clamped bolt at right angles to the friction surfaces in ordinary up-and-down play, it induces an equality of friction per unit of surface and an evenness of wear which would be entirely unattainable with the Truffault patent construction No. 743,995 heretofore mentioned. Another desirable result attainable resides in the fact that both the available extent of friction surface and the effectiveness of that surface are increased by this bifurcation of the arm.

Interposed between these friction disks are suitable friction washers 6 and 7 made of leather, fiber, or other suitable material, the friction disks and washers being held in close association by means of an adjustable pivotal connection, which permits of a limited rotation as well as lateral movement of the parts with respect to one another. This connection is an adjustable one, forming as it were an adjustable clamp by means of which a greater or less extent of frictional adherence between the parts may be obtained. I accomplish this by means of a bolt 8 having at one end a disk-like head 9, which is rigidly fastened to the disk 4, by means of suitable rivets 10 to insure against any independent rotation of either. Mounted on the bolt 8, and bearing against the friction disk 5, I provide a spring washer 11 of spider outline and it is by the employment of this spring washer that I obtain the internal flexibility, which is deemed essential in a device of this kind and, furthermore, it is by the means of this spider spring that I am enabled to apply the spring pressure at that zone of the disks, where the greatest frictional contacting surface exists. By reason of the feet of the spring being disposed at equidistant points near the periphery of the disk 5, upon which it bears, this spring of this particular formation employed in this particular combination is productive of a result which is not obtainable by any other formation of spring. The primary beneficial result obtained by use of the spider spring is due to its ability of being compressed or expanded outwardly to the limits of its own thickness if necessary and to the further facts that it naturally has a large diameter and brings the pressure near the outer periphery of the friction disks where the greatest movement occurs, and forms its own pressure distribution, bearing directly on one of the friction members without the intervention of a distributing plate such as would be required if a spring of coiled formation were employed. Another equally desirable result is obtained by reason of its characteristic inherent quality of range of compressibility which permits of frictional adjustment to meet the varying working conditions when applied to cars of different weights whereas a coiled spring is limited in this respect and the tension of the latter is more easily destroyed. Furthermore and finally, the feet of the spring being distributed around the peripheral portion of the disks are independently movable under stress, thus permitting certain of the feet to yield upon the cant of the central friction disk when the vehicle body sways, while other feet of the spring are operating with the desired pressure to produce the necessary friction between the parts. This produces in the whole a structure having very great internal flexibility as distinguished from the use of a coiled spring, whose pressure is constant and fixed in direction on the frictional elements, and not at different variable points.

The clamping nut 12 and lock nut 13 are mounted on the bolt 8, the clamping nut 12 bears against a thin washer 14 interposed between it and the spring washer and serves to put the latter under the required tension. The disk 5 upon which the spider spring presses as well as the disk 3 and friction washers 6 and 7 are freely mounted on the bolt 8, the disks 4 and 5 are connected together through their arms 2 (forming the fork or bifurcated construction heretofore described) by means of suitable bolts 22, an adjustment of the nut 12 along the bolt 8 will release or put the spring 11 under more or less tension causing it to regulate the degrees of frictional adherence between the disks according to the desired requirements. The operating arms 1 and 2 are provided with frictionally retarded connecting means for securing said arms to the running gear and body of the vehicle. Two such connecting means are shown. In Fig. 3 of the drawings, 15 is the operating arm to which is secured a collar or sleeve 16, provided with integral cone-shaped surfaces 17. Two friction washers, or cones 18—18 are adapted to extend partly within said sleeve and are held in place by means of the bolt 19 passing through said cones, and a nut 20, which serves to hold them in place and adjust the tension thereof. Suitable frictional material or washers 21 may also be provided between the shoulder of the collar and the cones. In Fig. 5 is shown a construction somewhat similar, but in this form there is but one cone-shaped washer 18, which cooperates with the beveled shoulder on the sleeve, while a nut 20 on the bolt 19 serves to adjust the tension. It will be understood that the beveled washer, or cone 18 as shown in Fig. 5, is secured rigidly to the bolt 19. The same is true of the right hand washer in Fig. 3. By adjusting nut 20, the tension of the friction surfaces may be readily regulated.

From the foregoing description the operation of the device will be readily understood. One of the operating arms is secured to the running gear of the vehicle, and the other arm to the body portion. By adjusting the tension of the various frictionally contacting parts the action of the supporting springs in the vehicle may be retarded to any desired extent, a little adjustment being usually necessary to ascertain the most effective degree of tension, and when this adjustment has been made it will be preserved through the compensating spring pressure of the spider. It will be clearly seen that a number of modifications may be made in my device without departing from the general spirit thereof, and many changes may be made from the exact form illustrated.

Having thus described my invention, what I claim as new herein and desire to secure by Letters Patent is:

1. A shock absorber for vehicles having spring supporting means, the same comprising a device, the parts of which move with a reluctance or drag and means for attaching said device to relatively independently movable parts of a vehicle to modify the action of the spring supporting means, and means for adjusting or varying the degree of reluctance or drag in the movement of the parts, said means comprising a spider-shaped spring associated with said parts to apply pressure at a plurality of equidistant points thereagainst.

2. A shock absorber comprising a pair of arms, a bolt for securing said arms together at one end, a spring disposed upon said bolt having a plurality of radial members acting upon one of said arms adjacent to the outer edge of the pivoted end thereof, and means to increase the pressure of said spring to maintain a proportionally constant and uniform degree of frictional engagement between said parts at points successively removed from said bolt as the pressure upon said spring is increased and to bring the more effective portions of said parts into operation as greater degrees of retardation are required.

3. A shock absorber for vehicles having spring supporting means, the same comprising a device the parts of which move with a reluctance or drag, means for attaching said device to relatively independently movable parts of a vehicle to modify the action of the spring supporting means, and means for adjusting or varying the degree of reluctance or drag in the movement of the parts, said means comprising a device associated with said parts to apply pressure at a plurality of equidistant points thereagainst.

4. A shock absorber for vehicles having spring supporting means, comprising an arm adapted to be attached to one movable part of the vehicle, a bifurcated arm pivoted to and embracing said first arm and adapted to be attached to a different part of the vehicle, a plurality of means coöperating with the arms for producing a drag or retardative action on the movement of the spring supporting means, and a substantially flat metal spring formed to exert a uniform pressure upon the retardative means of said shock absorber.

5. A shock absorber for vehicles having spring supporting means, comprising an arm adapted to be attached to one movable part of the vehicle, a bifurcated arm pivoted to and embracing said first arm and adapted to be attached to a different part of the vehicle, a plurality of disks coöperating with said arms for producing a drag or retardative action on the movement of the spring supporting means, and a device formed to exert a constant pressure adjacent to the outer peripheries of said disks and the coöperating surfaces of said arms.

6. A shock absorber for vehicles having spring supporting means, comprising an arm adapted to be attached to one movable part of the vehicle, a bifurcated arm pivoted to and embracing said first arm and adapted to be attached to a different movable part of the vehicle, and means coöperating with the arms for producing a drag or retardative action on the movement of the spring supporting means, said means including a device associated with said parts to apply pressure at a plurality of equidistant points thereagainst, the pressure-applying surfaces of said device being independently movable under stress.

7. A shock absorber for vehicles having spring supporting means, comprising inner and outer superposed friction disks, the alternate disks being composed of unlike material of different degrees of hardness, means for supporting said disks in superposed relation, the outer disks being connected to prevent relative rotation thereof, means for attaching said connected disks to one of the parts of the vehicle, means for attaching a centrally located disk to another part of the vehicle, and a tensioning device mounted on said supporting means and adapted to maintain all of said disks in constant frictional contact over their entire opposed faces, whereby said disks will move with reluctance and retard the movement of the vehicle parts.

8. A shock absorber for vehicles having spring supporting means, comprising flat friction disks having portions extending from their peripheries adapted for connection to relatively oppositely movable parts of a vehicle, one of said friction disks being located intermediate of the others, friction elements disposed between the opposed faces of said disks, a pivotal support for said disks and said friction elements, and means mounted on said pivotal support for maintaining said disks and elements in coöperative association, said means including a tensioning device adapted to exert a constant pressure upon all of said parts, whereby said disks and said friction elements will function to retard the relative movement of the vehicle parts.

9. A shock absorber for vehicles having spring supporting means, comprising a plurality of annular disks having portions extending from their peripheries adapted for connection to relatively oppositely movable parts of a vehicle, one of said friction disks being located intermediate of the others, friction elements of substantially the same diameter as said disks disposed between the opposite surfaces of said disks, a pivotal support for said disks and said friction elements, and means mounted on said pivotal support for maintaining said disks and said elements in constant frictional contact over the entire areas of their opposed faces, said means including a tensioning device adapted to exert a predetermined pressure upon all of said parts, whereby said disks and said friction elements will function to retard the relative movement of the vehicle parts.

10. A shock absorber for vehicles having spring supporting means, comprising inner and outer superposed flat annular disks, means for supporting said disks in superposed relation, means for connecting the outer disks to prevent relative rotation thereof, said means being adapted for attachment to a movable part of the vehicle, means for connecting an intermediate disk to another part of the vehicle, and a tensioning device mounted on said supporting means and adapted to exert pressure upon all of said disks to maintain the same in constant frictional contact over their entire opposed faces, whereby said disks will move with a reluctance and retard the relative movement of the vehicle parts.

In witness whereof I have hereunto set my hand in the presence of two subscribing witnesses.

EDWARD VASSALLO HARTFORD.

Witnesses:
  WILLIAM P. MONTGOMERY,
  HENRY D. KENSING.